No. 727,503.

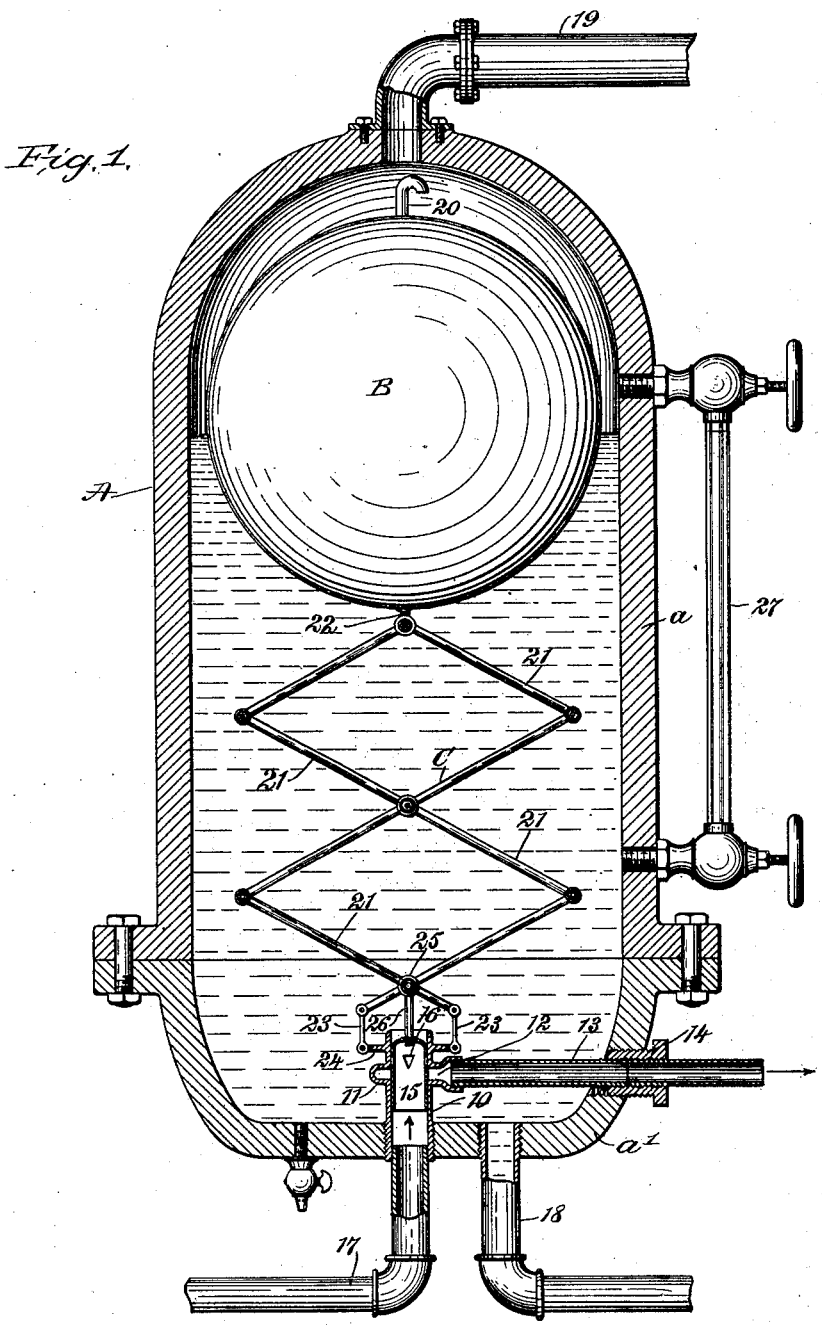

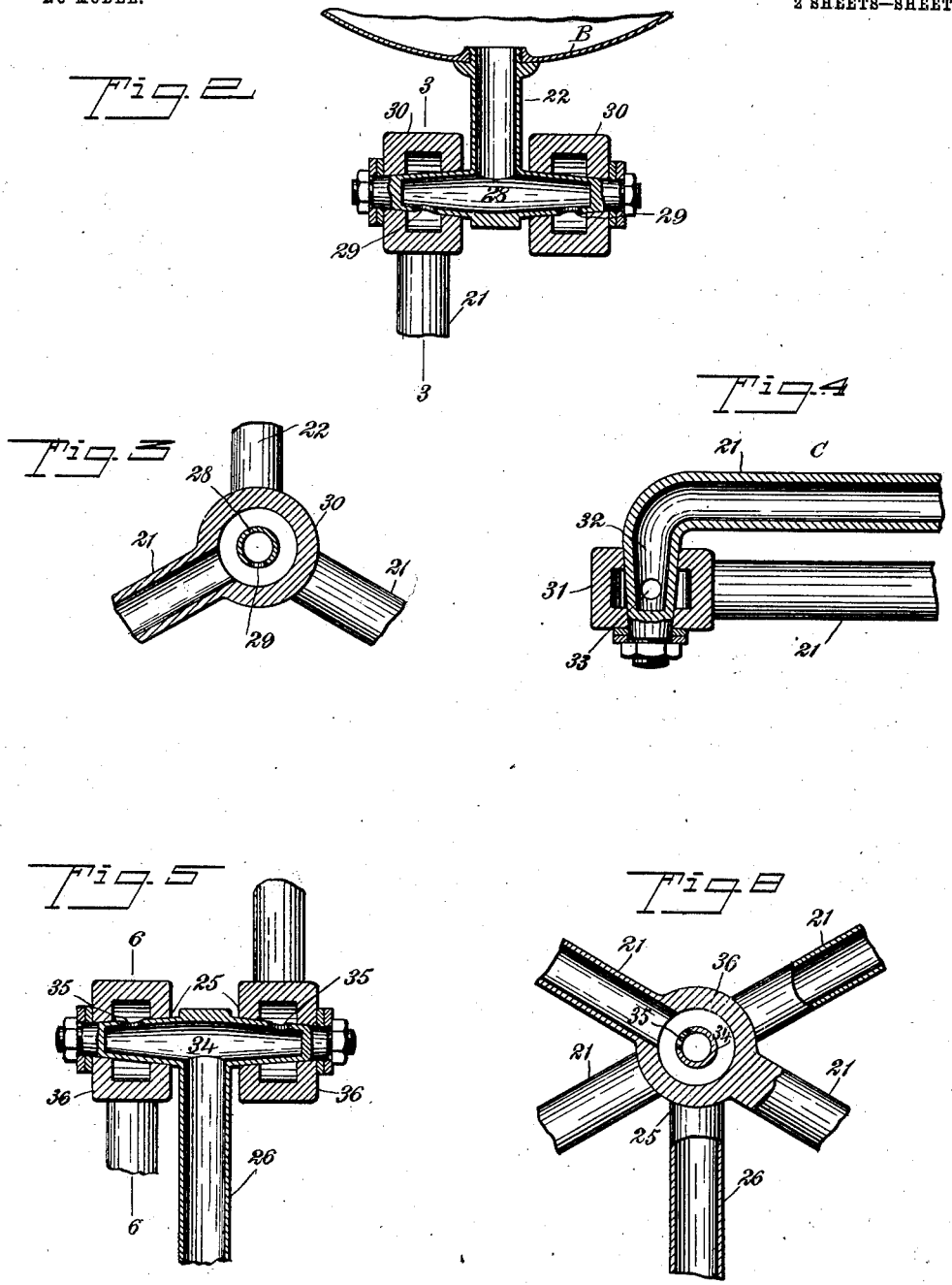

Patented May 5, 1903.

UNITED STATES PATENT OFFICE.

BENJAMIN WALKER, JR., OF AUSTIN, TEXAS.

WATER-REGULATOR FOR STEAM-BOILERS.

SPECIFICATION forming part of Letters Patent No. 727,503, dated May 5, 1903.

Application filed April 1, 1902. Serial No. 100,948. (No model.)

*To all whom it may concern:*

Be it known that I, BENJAMIN WALKER, Jr., a citizen of the United States, and a resident of Austin, in the county of Travis and State of Texas, have invented a new and Improved Water-Regulator for Steam-Boilers, of which the following is a full, clear, and exact description.

The purpose of the invention is to automatically regulate the water in steam-boilers by providing a regulating vessel in communication with the water-space of the boiler, in which vessel the water will find a corresponding level, and providing the vessel with a float-controlled valve arranged to open and close the steam-pipe to the pump or injector supplying the boiler with water.

Another purpose of the invention is to provide means whereby the float controlling the valve will not be liable to fill with water by sweating or actual leakage and to provide a means whereby the float will not be liable to collapse by reason of the high pressure at the boiler, and, further, to so construct the regulator that it will not be bulky or unnecessarily heavy.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical section through a regulator, the pipes connected therewith appearing one in full longitudinal section and the other in sectional side elevation. Fig. 2 is a section through the lower portion of the float and the connection between the float and supporting tubular lazy-tongs. Fig. 3 is a section on the line 3 3 of Fig. 2. Fig. 4 is a section through portions of two connecting members of the tubular lazy-tongs, illustrating the manner in which they are pivoted in communication with each other. Fig. 5 is a sectional view illustrating the manner in which the lazy-tongs are in pivotal and tubular connection with the valve, and Fig. 6 is a section on the line 6 6 of Fig. 5.

A cylinder A constitutes the shell of the regulator, and said shell is made in two sections $a$ and $a'$, connected in a water and steam tight manner. A tubular valve-casing 10 open at the top and bottom is screwed or otherwise secured in the central bottom portion of the shell, and between its ends the casing is provided with an annular chamber 11, produced by laterally enlarging the casing. Said chamber 11 has an outlet 12, into which the inner end of a steam-pipe 13 is introduced, and said pipe extends out through suitable glands 14 in the shell to a connection with the pump or injector used to supply the boiler with water.

A cup-valve 15, closed at its top and open at its lower end, is mounted to slide in the valve-casing, being provided with ports 16, arranged when the valve is pushed downward to register with the chamber 11, and thus admit steam to said chamber, from whence it passes to the pump or injector-pipe 13, steam being constantly supplied to the valve by a pipe 17, connected with the valve-casing and with the steam-space of the boiler. When the valve 15 is in its upper position, as shown in the drawings, the chamber 11 is completely closed and the valve occupies such a position while there is high water in the boiler. The regulator is further provided with upper and lower equalizing-pipes 18 and 19, connected with the water-chamber of the boiler. A float B is located within the shell A, supported by the column of water therein, and said float is provided with a curved or gooseneck tube 20 at its central upper portion to admit air to the float and enable it to withstand high pressure from the boiler.

A lazy-tongs C is used to operatively connect the float B with the valve 15, said tongs being also employed to conduct any water which may accumulate in the float to the valve 15, through which the water will pass to the steam-pipe 17, connected with the boiler. All of the members 21 of the lazy-tongs are tubular, and where the members are pivotally connected with each other the connections are such as to establish communication between the members, as will be hereinafter described.

The upper members of the lazy-tongs are pivotally connected with a chambered plug 22, the chamber whereof has communication with the interior of the float B; but the lower ends of the lower members of the lazy-tongs are closed and are pivotally connected by links 23 with arms 24, extending from the upper portion of the valve-casing 10. At the pivotal connection 25 for the lower members of the lazy-tongs C a tube 26 is provided, connected with and extending through the top of the valve 15. This tube 26 conducts the water from the members of the lazy-tongs to the valve 15, from which the water passes to the steam-pipe 17, the members of the lazy-tongs having received the water from the float. The shell is provided with a gage-glass 27 of the usual type.

In operation while there is high water in the boiler the float will be at the upper portion of the shell, as is shown in the drawings, and the valve 15 will close the steam-chamber 11, and therefore the pump or injector will be idle; but when the water is at a predetermined low level the float will have dropped down sufficiently to fold the lazy-tongs to a certain extent and cause the tube 26 to carry the valve 15 downward, opening up communication between the steam-pipe 17, connected with the boiler, and the pipe connected with the injector to start the same, the communication being made through the aforesaid chamber 11.

The valve shown in the drawings may be replaced by a governor-valve or a similar valve and may be placed on the outside of the shell A just below where it appears in the drawings, if so desired.

In Fig. 2 I have illustrated a coupling connection between the float B and the lazy-tongs C, wherein the chambered plug 22 is provided with a horizontal lower tubular member 28, tapering in direction of its ends and closed at its ends, said member 28 being provided with apertures or ports 29 near its extremities. The end portions of the horizontal member 28 pass through chambered enlargements 30 at the upper ends of the upper members of the lazy-tongs and turn therein, the ports or apertures 29 being within said chambered enlargements 30. In this manner the lazy-tongs are free to act; yet communication is established between the members of the tongs and the float, and practically the same connection is usually employed where the members of the lazy-tongs are pivotally connected between their ends.

In Fig. 4 I have shown the usual way of connecting the ends of the lazy-tong members, in which it will be observed that one member is provided with a chambered enlargement 31 and the other member with a tubular tapering extension 32 at right angles thereto closed at its end and mounted to turn in the said chambered enlargements 31, having an aperture or port 33 within said enlargement.

In Figs. 5 and 6 I have shown the preferred manner of effecting a communicating pivotal connection between the lower members of the lazy-tongs and between said members and the valve 15, which consists in providing the valve-connecting tube 26 with a tubular tapering head 34, closed at its ends and provided near its ends with apertures 35, which apertured portions of the head 34 are passed through and mounted to turn in enlargements 36, formed upon said lower members of the tongs nearer their lower than their upper ends.

Having thus described my invention, I claim as new and desire to secure by Letters Patent—

1. In water-regulators for steam-boilers, a valve having means for connection with an injector or pump and means for connection with the steam-space of a boiler, a float, and a tubular operative connection between the float and valve, said connection also serving to convey water accumulating in the float to the valve, for the purpose described.

2. In a water-regulator for steam-boilers, a shell, a valve, a float located within the shell, tubular lazy-tongs connecting the float with said valve, a steam-pipe connected with the valve, an injector-pipe likewise connected with the valve, and regulating-pipes connected with the shell, for the purpose set forth.

3. In a water-regulator for steam-boilers, a shell, a valve-casing adapted for connection with the steam-space of a boiler, said casing being likewise provided with means for connection with a pump or injector, a sliding cup-valve operating in the casing to open or close communication between the steam connection with the casing and the connection with the injector or pump, a float located within the shell, and lazy-tongs connecting the float with the said valve, whereby the valve is opened and closed through the movement of the float, for the purpose set forth.

4. In water-regulators for steam-boilers, a shell, a valve in the lower portion of the shell and provided with means for connection with the steam-space of a boiler and with a pump or injector, a float in the shell and a tubular connection between the bottom of the float and the valve, which tubular connection has communication with the interior of the float, whereby the valve is operated by the float and water accumulating in the float is discharged through the valve through the medium of the said tubular connection, as described.

5. In a water-regulator for steam-boilers, the combination with a shell, a valve having means for connection with the steam-space of the boiler and with an injector or pump, regulating-tubes connected with the shell at opposite ends and adapted for connection with the water-space of a boiler, a float within the shell, having an air-vent at its upper portion, lazy-tongs the members of which are tubular and the connections between the members such as to establish communication between the members, the upper members of the lazy-tongs being pivotally connected with the float and having communication with the interior of the float, pivotal supports for the lower members of the lazy-tongs, and a tube connected with sundry of the members of the lazy-tongs and with the said valve, for the purposes set forth.

6. In a regulator for steam-boilers, a shell, an open-ended valve-casing in the shell and provided with an annular chamber, a steam-pipe connected with said chamber, a steam-pipe connected with the lower end of the valve-casing, a sliding cup-valve in the casing and provided with ports, a float, and tubular lazy-tongs connecting the float with the valve, said lazy-tongs communicating with the interior of the float and valve, as set forth.

In testimony whereof I have signed my name to this specification in the presence of two subscribing witnesses.

BENJAMIN WALKER, JR.

Witnesses:
  BEN. WALKER, SR.,
  JULIAN C. CUDY.